United States Patent
Kurita et al.

(10) Patent No.: US 10,456,725 B2
(45) Date of Patent: Oct. 29, 2019

(54) FILTER FRAME FOR AN IMAGE FORMING APPARATUS

(71) Applicant: CANON KABUSHIKI KAISHA, Tokyo (JP)

(72) Inventors: Shigeharu Kurita, Abiko (JP); Yoshimasu Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 15/813,628

(22) Filed: Nov. 15, 2017

(65) Prior Publication Data

US 2018/0147517 A1 May 31, 2018

(30) Foreign Application Priority Data

Nov. 25, 2016 (JP) ................................ 2016-228435

(51) Int. Cl.
  *B01D 46/00* (2006.01)
  *B01D 46/10* (2006.01)
  (Continued)

(52) U.S. Cl.
  CPC ..... *B01D 46/0005* (2013.01); *B01D 46/0001* (2013.01); *B01D 46/0002* (2013.01); *B01D 46/10* (2013.01); *B01D 46/521* (2013.01); *G03G 21/206* (2013.01); *B01D 2265/028* (2013.01); *B01D 2271/027* (2013.01); *B01D 2279/45* (2013.01)

(58) Field of Classification Search
  CPC ............ B01D 46/0001; B01D 46/0002; B01D 46/0005; B01D 46/0016; B01D 46/10; B01D 46/521; B01D 2265/028; B01D 2271/027; B01D 2279/45; G03G 21/206
  See application file for complete search history.

(56) References Cited

U.S. PATENT DOCUMENTS 3,938,973 A * 2/1976 Kershaw ............ B01D 46/0002
  55/501
4,105,423 A * 8/1978 Latakas .............. B01D 46/0002
  55/501

(Continued)

FOREIGN PATENT DOCUMENTS

JP   H11-63597 A    3/1999
JP   2007-516829 A  6/2007

*Primary Examiner* — Robert Clemente
(74) *Attorney, Agent, or Firm* — Venable LLP

(57) ABSTRACT

Provided is a filter frame, including: a rectangular base part including plural engaging holes formed each side thereof; an extension portion extending outward from each of the sides and including plural engagement projections corresponding to the plural engaging holes; a termination portion formed at an end of the extension portion and including a bent portion; and a hinge coupling each extension portion with the rectangular base part, wherein the rectangular base part, the extension portions, the termination portions, and the hinges are formed integrally, wherein the rectangular base part allow a rectangular dust proof filter to be placed thereon, wherein the extension portions are bent at right angles to the rectangular base part, and then the extension portions are engaged with the rectangular base part so as to clamp the dust proof filter, and wherein the termination portions are elastically deformed and fixed to inner walls of a duct.

2 Claims, 10 Drawing Sheets

(51) Int. Cl.
*B01D 46/52* (2006.01)
*G03G 21/20* (2006.01)

(56) References Cited

U.S. PATENT DOCUMENTS

| | | | | |
|---|---|---|---|---|
| 4,636,233 A * | 1/1987 | Lizmore | ............ | B01D 46/0002 229/172 |
| 5,342,423 A * | 8/1994 | Taft | .................... | B01D 39/1623 55/483 |
| 5,655,825 A * | 8/1997 | Anoszko | ............ | B01D 46/0002 312/262 |
| 7,169,202 B2 | 1/2007 | Kubokawa | | |
| 2004/0172928 A1* | 9/2004 | Kubokawa | ......... | B01D 46/0005 55/497 |
| 2005/0138905 A1* | 6/2005 | Kubokawa | ......... | B01D 46/0016 55/497 |
| 2007/0204573 A1* | 9/2007 | Justice | ............... | B01D 46/0013 55/495 |
| 2013/0327004 A1* | 12/2013 | Lise | ................... | B01D 46/0002 55/493 |
| 2015/0013287 A1 | 1/2015 | Yamaguchi et al. | | |
| 2015/0277373 A1* | 10/2015 | Yamaguchi | ........ | B01D 46/0002 55/495 |
| 2016/0378057 A1 | 12/2016 | Yamaguchi et al. | | |

\* cited by examiner

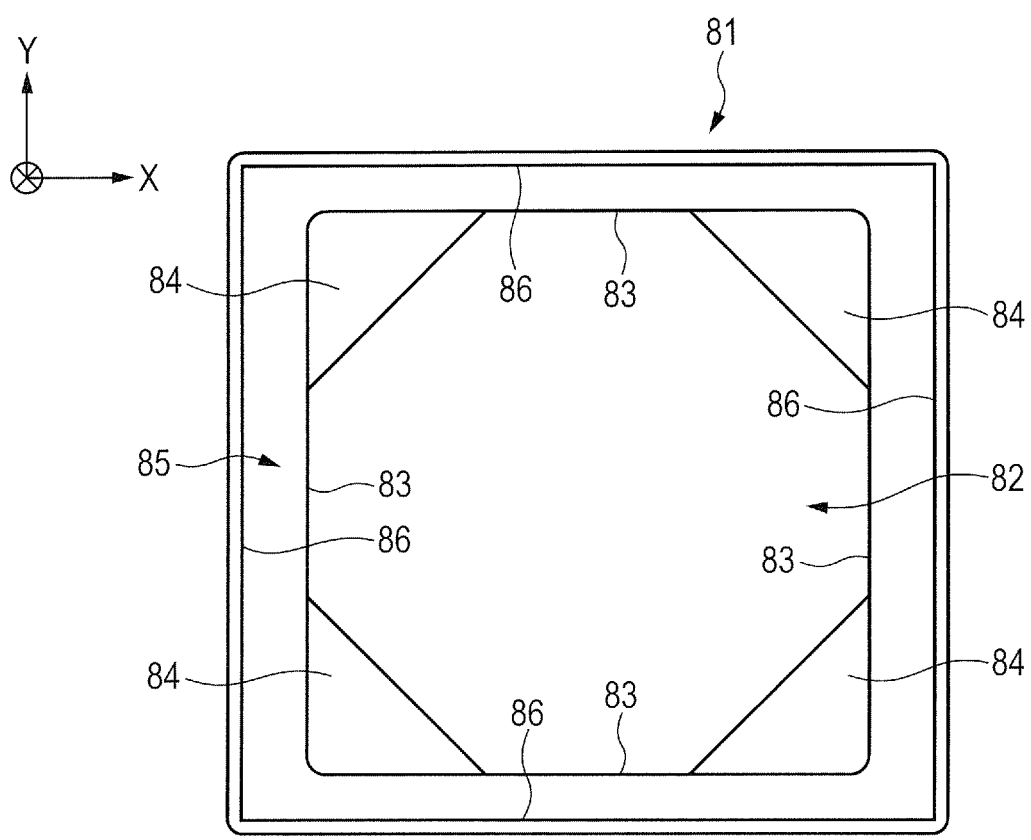

FILTER FRAME FOR AN IMAGE FORMING APPARATUS

BACKGROUND OF THE INVENTION

Field of the Invention

The present invention relates to a structure of a dust collecting filter to be arranged in an exhaust duct of an image forming apparatus.

Description of the Related Art

In an apparatus main body of a generally-used image forming apparatus, there are installed electrical components, such as a plurality of motors, a fan, and a power board. The electrical components are installed in the apparatus main body to serve as driving sources for various components (unit configurations) from conveyance of a sheet to delivery of a product through image formation. However, as a matter of course, when the electrical components such as a motor and an electrical board are operated, heat is generated from main bodies of the electrical components. The heat is accumulated in the main body of the image forming apparatus, and increases a temperature in the main body. This may cause, for example, thermal deformation of a member, such as a sheet conveyance guide, which is made of plastic and installed in the main body of the image forming apparatus, and thus may cause a jam of the conveyed sheet.

Depending on an environment of a place where the image forming apparatus is installed, dirt and dust may be accumulated in the apparatus main body, and dirt and dust may be swirled up and float due to vibration accompanied with operation of the apparatus, or due to an airflow generated by a fan. As a result, for example, dirt and dust adhere to a surface of a sheet so that an image is partially missed when the image is transferred to the sheet. That causes degradation of image quality due to the image defect.

In general, a fan and a duct are provided for the purpose of purifying the air in the main body of the image forming apparatus and discharging the air from the main body of the image forming apparatus, and a filter for use in collection of dust is arranged in a passage of the duct. For example, in Japanese Patent Application Laid-Open No. 2007-516829, a technology of forming a filter assembly is described explicitly. According to this technology, a pleated filter is placed on a base frame including a placement portion on which the filter is to be placed. A cover frame integrated with the base frame by a hinge is pivoted about the hinge being a pivoting fulcrum. Then, the filter is clamped between the base frame and the cover frame, and fitting protrusions formed on the cover frame are fitted into fitting holes formed in cantilevered bar members of the base frame. In this manner, the filter assembly is closed and formed.

With this configuration, the filter soiled by catching dirt and dust can be removed. That is, the soiled filter can be replaced with a new filter. Accordingly, replacement work to be performed during maintenance is simplified so that a considerable advantage is obtained.

Further, in Japanese Patent Application Laid-Open No. H11-63597, the following technology is described. That is, a flat-plate-like filter is placed on a latticed first frame that is on a side of placing the filter, and a second frame integrated with the first frame by hinges and configured to clamp the filter together with the first frame is bent at the hinges. Thus, the second frame is bent to overlap the first frame, to thereby fold a filter assembly into two halves. Then, engagement claws formed on the first frame are engaged with frame portions (thin plates) of the second frame.

In addition, bending pieces integrated with the first frame by hinges are bent at the hinges, and engagement holes formed in the bending pieces are engaged with engagement protrusions formed on the second frame. In this manner, the filter assembly is formed. Thus, when the filter assembly integrally formed by the frames and the filter together is soiled, hitherto, the entire filter assembly has been replaced. However, only the soiled filter can be replaced with a new filter. Accordingly, reduction in running costs can be achieved.

In the filter structure described in Japanese Patent Application Laid-Open No. 2007-516829, when regular replacement work for the soiled filter is performed, it is necessary to perform work of disengaging the cantilevered bar members, which have the fitting holes and are provided on the base frame of a filter case, one by one from the fitting protrusions formed on the cover frame. Accordingly, there is a problem in that much time and labor are needed to remove the soiled filter from the filter case.

In the filter structure described in Japanese Patent Application Laid-Open No. H11-63597, when a new filter is to be placed in the filter case, there is performed work of fitting the first frame and the second frame to each other with the engagement claws and the frame portions. After that, the bending pieces having the engagement holes are bent at the hinges, and the engagement holes are engaged with the engagement protrusions provided on the frame. In this manner, the filter frame is assembled. When the soiled filter is to be removed, the above-mentioned work is reversely performed. In this manner, the plurality of engaged portions are engaged or disengaged one by one. Accordingly, there is a problem in that much time and labor are needed.

The present invention has been made to solve the problems of the related art. According to the present invention, a filter frame reliably holds a dust collecting filter, and a dust collecting function of the dust collecting filter is reliably ensured. Further, the filter frame has a simple structure. It is an object of the present invention to provide, with the above-mentioned configuration, a filter frame for an image forming apparatus, which enables reliable assembly and replacement of a dust collecting filter with respect to the filter frame.

SUMMARY OF THE INVENTION

According to one embodiment of the present invention, there is provided a filter frame for an image forming apparatus, including: a rectangular base part including a rectangular opening, defining a rectangular outer shape, and including a plurality of engaging holes formed each side thereof; an extension portion extending outward from each of the sides of the rectangular base part, and including a plurality of engagement projections corresponding to the plurality of engaging holes; a termination portion formed at an end of the extension portion and including a bent portion; and a hinge configured to couple each of the extension portions with the rectangular base part, wherein the rectangular base part, each of the extension portions, each of the termination portions, and each of the hinges are formed integrally, wherein the rectangular base part allow a dust proof filter having a rectangular plate-like shape to be placed thereon, wherein each of the extension portions is turned about each of the hinges and bent at right angle to the rectangular base part, and then each of the extension portions is engaged with each of the sides of the rectangular base part so as to clamp the dust proof filter, and wherein each of the termination portions is elastically deformed and fixed to an inner wall of each side of a duct.

Further features of the present invention will become apparent from the following description of exemplary embodiments with reference to the attached drawings.

BRIEF DESCRIPTION OF THE DRAWINGS

FIG. 8 is a front view for illustrating the duct as seen from the direction of mounting the filter.

DESCRIPTION OF THE EMBODIMENTS

First Embodiment

Figure 1:
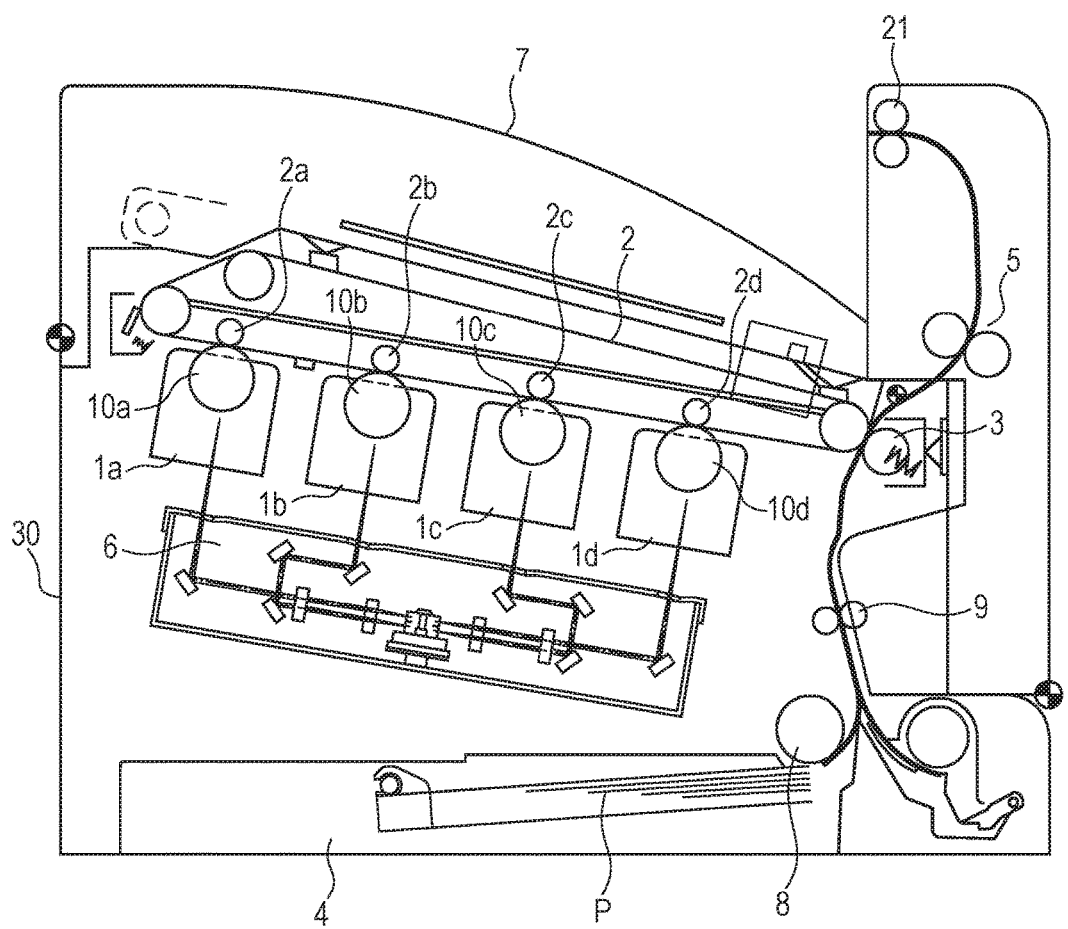
FIG. 1 is a view for illustrating an overall configuration of an image forming apparatus of an embodiment of the present invention.

An embodiment of the present invention is described below with reference to the accompanying drawings. FIG. 1 is a view for illustrating an overall configuration of an image forming apparatus of the first embodiment. First, image forming process is described with reference to FIG. 1.

In the image forming apparatus illustrated in FIG. 1, there are arranged four photosensitive drums 10*a*, 10*b*, 10*c*, and 10*d* configured to form toner images of yellow, magenta, cyan, and black, respectively. A charger, a developing device, and a cleaner, which are not shown, are arranged around each of the photosensitive drums 10*a* to 10*d*. The charger, the developing device, the cleaner, and each of the photosensitive drums 10*a* to 10*d* are assembled into a unit as each of process cartridges 1*a*, 1*b*, 1*c*, and 1*d*. An intermediate transfer belt 2 employed as an example of a belt body is arranged above the process cartridges 1*a* to 1*d* so as to be held in contact with the photosensitive drums 10*a* to 10*d*.

The photosensitive drums 10*a* to 10*d* are charged by the chargers (not shown), respectively, and are exposed by an exposure device 6 to color-separated optical images of yellow, magenta, cyan, and black, respectively. Then, latent images of yellow, magenta, cyan, and black are formed on the photosensitive drums 10*a* to 10*d*, respectively. The latent images are developed by the developing devices, respectively, and toner images of yellow, magenta, cyan, and black are formed on the photosensitive drums 10*a* to 10*d*, respectively.

Along with rotation of the photosensitive drums 10*a* to 10*d*, the toner images are brought to primary transfer regions where the photosensitive drums 10*a* to 10*d* are held in abutment against the intermediate transfer belt 2. The toner images are successively transferred to the intermediate transfer belt 2, which is a moving image bearing member, by primary transfer rollers 2*a*, 2*b*, 2*c*, and 2*d* arranged to be opposed to the photosensitive drums 10*a* to 10*d*. A primary transfer bias is applied to the primary transfer rollers 2*a* to 2*d* by an electrical board.

Sheets P stored in a feed cassette 4 are fed one by one by a pickup roller 8, and timing of the fed sheet is matched at registration rollers 9. After that, the sheet P is conveyed to a nip portion formed by a secondary transfer roller 3 and the intermediate transfer belt 2, and the toner images on the intermediate transfer belt 2 are secondarily transferred to the sheet P in a collective manner. After that, the sheet P having the toner images transferred thereon is conveyed to a fixing device 5.

The fixing device 5 applies heat and pressure to the sheet P, and the toner images are fixed on the sheet P. In this manner, toners of respective colors are melted and mixed together to form a full-color print image fixed on the sheet P. After that, the sheet P is delivered to a delivery tray 7 by a delivery conveyance unit 21 arranged downstream of the fixing device 5. Arrangement of components in the apparatus is described. In the image forming apparatus of the first embodiment, the feed cassette 4, the exposure device 6, the process cartridges 1*a* to 1*d*, the intermediate transfer belt 2, and the discharge tray 7 are arranged in the stated order from a lower side of a main body 30.

The image forming apparatus described above is multifunctional. Accordingly, the number of various components is increased, with the result that upsizing of the apparatus is accelerated, and increase in speed is accelerated. The number of electrical components being heat sources are increased in the main body of the image forming apparatus, a temperature in the main body is further increased. Thus, an exhaust duct is required to have higher exhaust efficiency. Along with the increase in speed, vibration of the apparatus main body is also increased. More dirt and dust float in the main body of the image forming apparatus, and hence higher dust collection efficiency is demanded for a dust collecting component (dust collecting filter) in the exhaust duct.

In order to ensure higher exhaust efficiency and higher dust collection efficiency of the exhaust duct having been demanded due to the upsizing of the apparatus accompanied by increase in functions and the increase in speed, it is essentially to perform regular maintenance on the dust collecting component (dust collecting filter), that is, regular replacement work for the dust collecting filter. There is increased a frequency of replacing the dust collecting filter that is soiled with collected dust. Thus, improvement in installability and replacement workability of the filter is required.

Next, a configuration of the dust collecting filter installed in the image forming apparatus of the first embodiment is described with reference to FIG. 2 to FIG. 8.

An XYZ coordinate system is illustrated in FIG. 2 to FIG. 8 to indicate directions of installing the dust collecting filter. More specifically, in width directions X of the dust collecting filter, a direction indicated by the arrow corresponds to a plus rightward direction, and a direction opposite to the direction indicated by the arrow corresponds to a minus leftward direction. Subsequently, in the depth directions Y of the dust collecting filter, a direction indicated by the arrow corresponds to a plus far-side direction, and a direction opposite to the direction indicated by the arrow corresponds to a minus near-side direction. Finally, in the height directions Z of the dust collecting filter, a direction indicated by the arrow corresponds to a plus upward direction, and a direction opposite to the direction indicated by the arrow corresponds to a minus downward direction.

A double circle mark represents a distal end of the arrow, and indicates the plus direction of each axis in the coordinate system toward the near side of the drawing sheet. A composite mark including a circle and a cross represents a rear end of the arrow, and indicates the plus direction of each axis in the coordinate system toward the far side of the drawing sheet.

Figure 2:
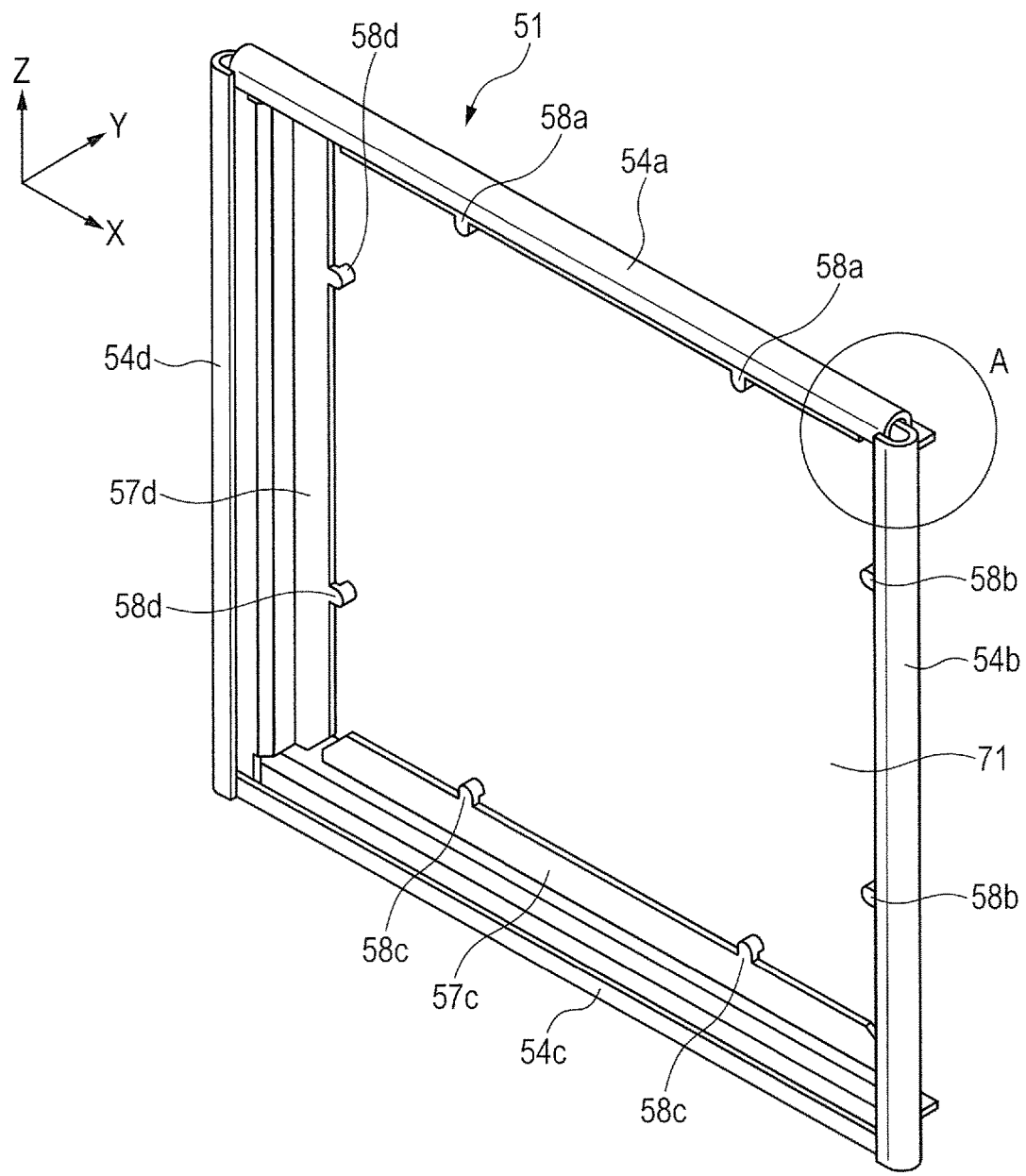
FIG. 2 is a perspective view for illustrating a filter frame to which a filter is assembled.
Figure 3A:
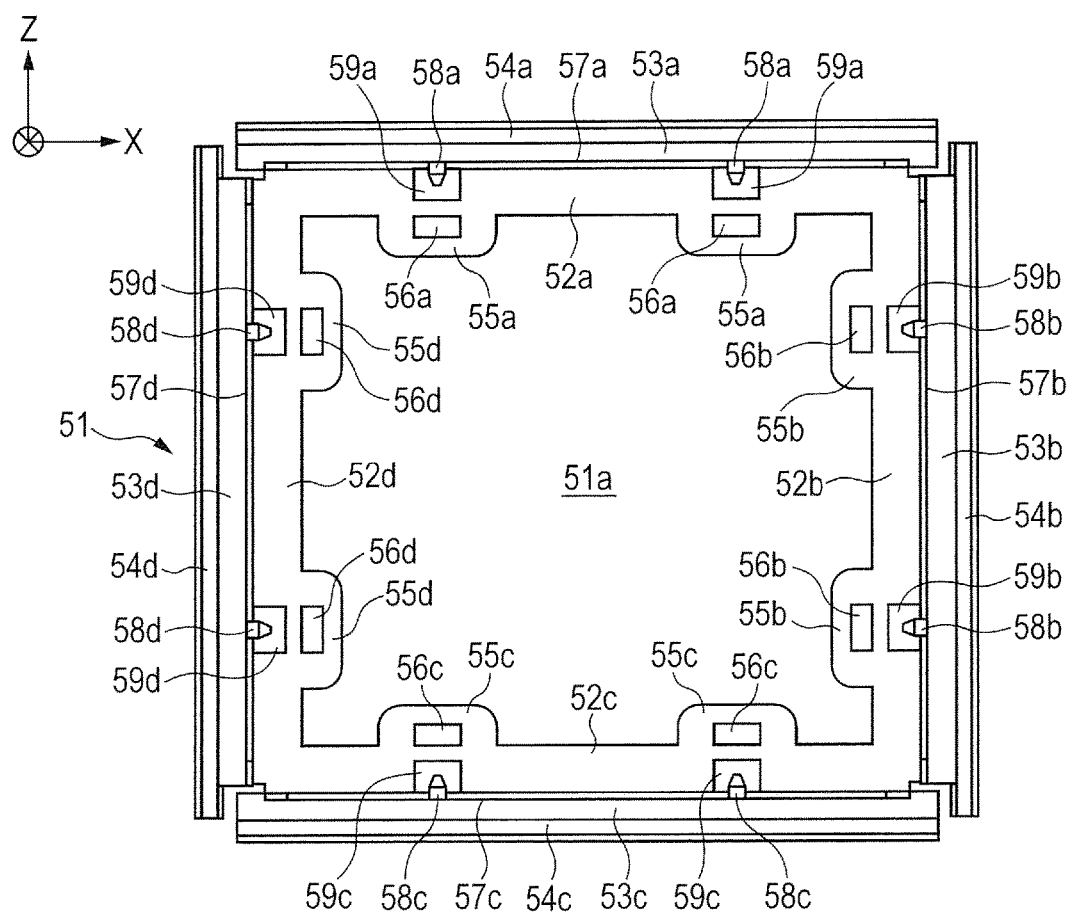
FIG. 3A is a front view as seen from a direction of mounting the filter.
Figure 3B:
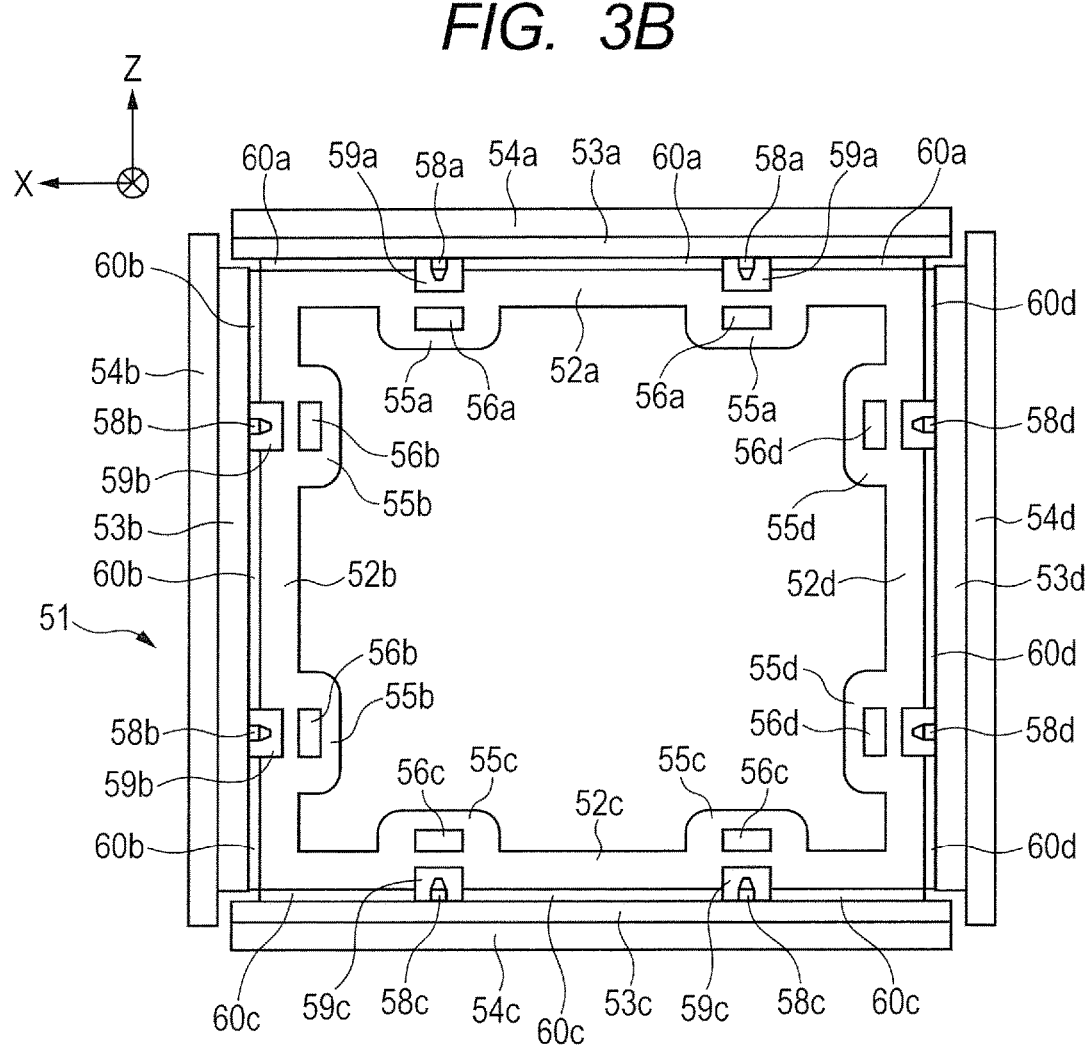
FIG. 3B is a perspective view as seen from a direction opposite to the direction of mounting the filter.
Figure 3C:
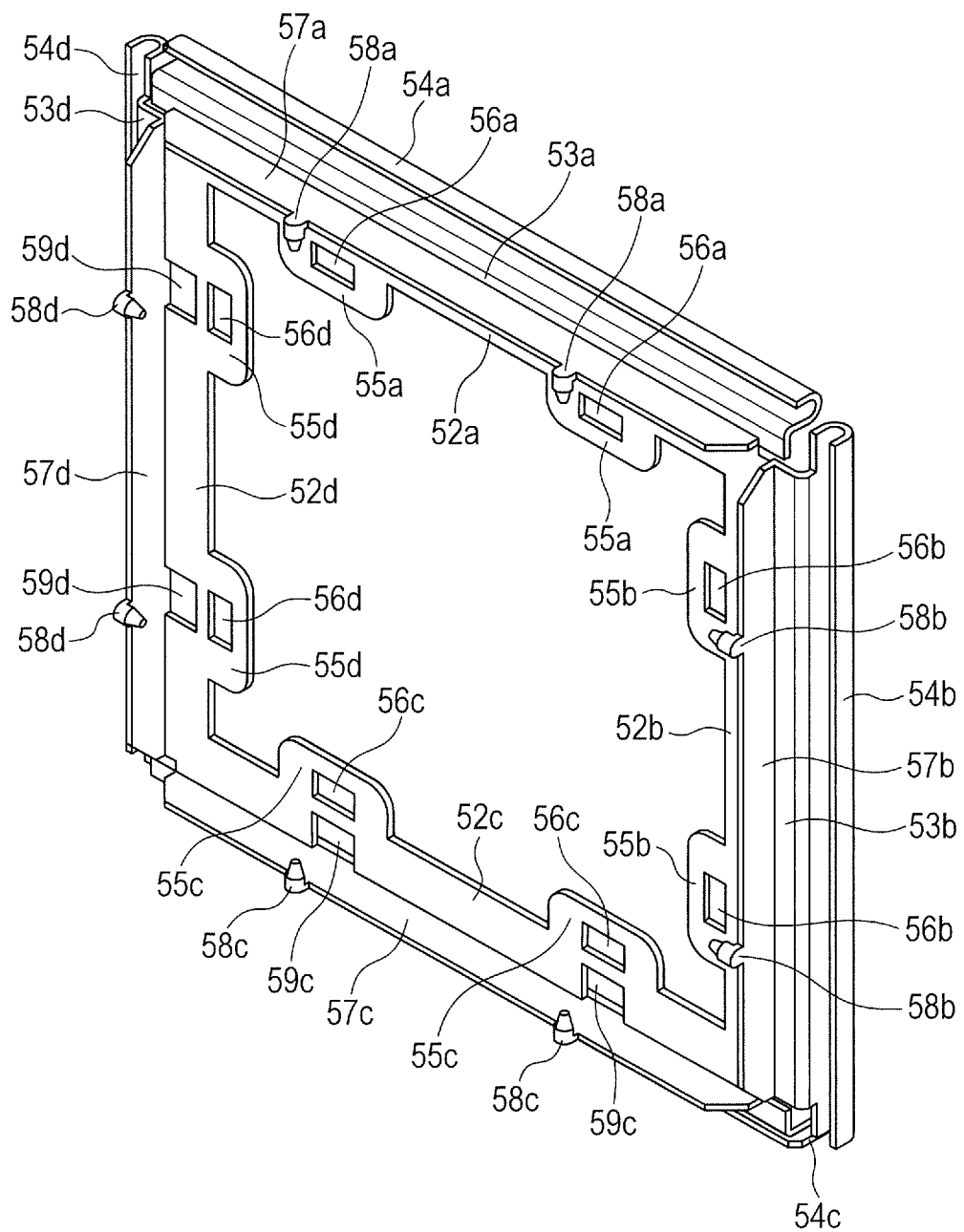
FIG. 3C is a perspective view for illustrating a front surface, a right side surface, and an upper surface.

FIG. 2 is a perspective view for illustrating a state in which a filter 71 (dust proof filter) is incorporated in a filter frame 51. The filter frame 51 is integrally formed of a resin material such as polypropylene or nylon. Four sides of the filter frame 51 are bent to clamp the filter 71. First, the configuration of the filter frame 51 in an initial state of undergoing resin molding processing is described with reference to FIG. 3A to FIG. 3C. FIG. 3A is a front view for illustrating the filter frame 51 as seen from a side of a mounting surface of the filter frame 51 to which the filter 71 is mounted. FIG. 3B is a back view for illustrating the filter frame 51 as seen from a fan side opposite to the side of the mounting surface to which the filter 71 is mounted. FIG. 3C is a view for illustrating the mounting surface to which the filter 71 is mounted.

The filter frame 51 has a rectangular shape, and integrally includes bases 52a, 52b, 52c, and 52d (rectangular base part), extension portions 53a, 53b, 53c, and 53d, and termination portions 54a, 54b, 54c, and 54d. The bases 52a, 52b, 52c, and 52d form sides of the filter frame 51, respectively, and are arranged on the same plane to define an opening (rectangular opening). The extension portions 53a, 53b, 53c, and 53d extend on the same plane as the bases 52a, 52b, 52c, and 52d in FIG. 3A. The termination portions 54a, 54b, 54c, and 54d further extend from the extension portions 53a, 53b, 53c, and 53d, respectively, and have a curved shape.

Protruding portions 55a are formed on the base 52a to extend to the opening side on the same plane as the base 52a. Protruding portions 55b are formed on the base 52b to extend to the opening side on the same plane as the base 52b. Protruding portions 55c are formed on the base 52c to extend to the opening side on the same plane as the base 52c. Protruding portions 55d are formed on the base 52d to extend to the opening side on the same plane as the base 52d. An engaging hole 56a is formed in each of the protruding portions 55a. An engaging hole 56b is formed in each of the protruding portions 55b. An engaging hole 56c is formed in each of the protruding portions 55c. An engaging hole 56d is formed in each of the protruding portions 55d.

A filter clamping rib 57a is formed perpendicularly to the same plane on which the base 52a and the extension portion 53a are formed. A filter clamping rib 57b is formed perpendicularly to the same plane on which the base 52b and the extension portion 53b are formed. A filter clamping rib 57c is formed perpendicularly to the same plane on which the base 52c and the extension portion 53c are formed. A filter clamping rib 57d is formed perpendicularly to the same plane on which the base 52d and the extension portion 53d are formed. The filter clamping ribs 57a, 57b, 57c, and 57d are arranged over substantially an entire region of the filter frame 51 in the width direction (both directions along the X axis) and substantially an entire region of the filter frame 51 in the height direction (both directions along the Z axis). Engagement projections 58a are formed to project from the filter clamping rib 57a. Engagement projections 58b are formed to project from the filter clamping rib 57b. Engagement projections 58c are formed to project from the filter clamping rib 57c. Engagement projections 58d are formed to project from the filter clamping rib 57d.

The bases 52a, 52b, 52c and 52d respectively have mold release holes 59a, 59b, 59c and 59d to form the engagement projections 58a, 58b, 58c and 58d by releasing in a Y axis direction. Hinges 60a, 60b, 60c, and 60d illustrated in FIG. 3B are each set to have a thickness smaller than thicknesses of peripheral portions to allow bending of the extension portions 53a, 53b, 53c, and 53d at substantially right angles to the bases 52a, 52b, 52c, and 52d, respectively.

As described above, the filter frame 51 has a shape capable of being molded during initial molding processing only by releasing the filter frame 51 from the mold only in the Y axis direction. Accordingly, the mold does not have a complex shape, and hence cost of the mold and the number of steps of maintenance for the mold can be reduced.

Next, with reference to FIG. 4A, FIG. 4B, and FIG. 5A to FIG. 5C, a configuration of mounting the filter 71 to the filter frame 51 is described.

Figure 4A:
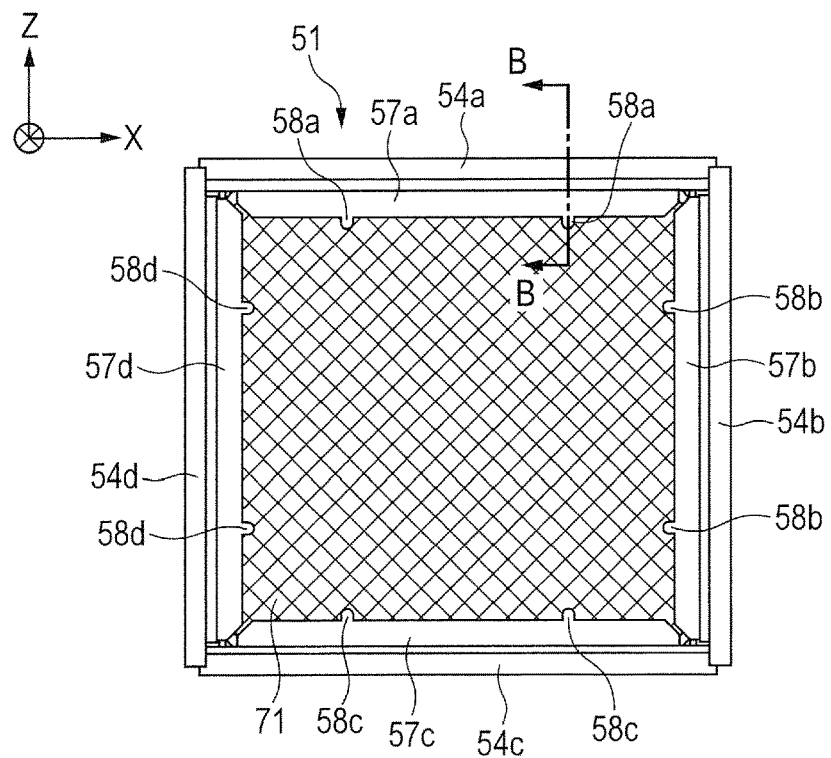
FIG. 4A is an explanatory view for illustrating a configuration of the filter frame to which the filter is assembled, and is a front view as seen from the direction of mounting the filter.
Figure 4B:
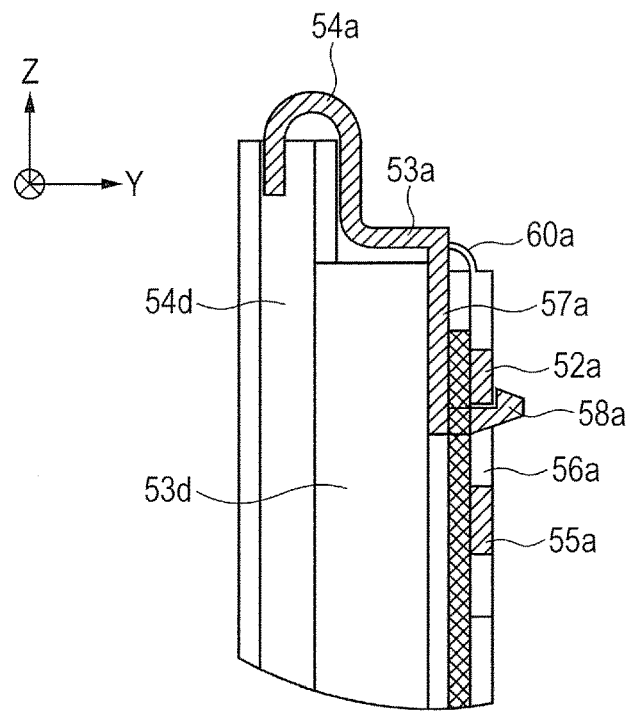
FIG. 4B is an explanatory view for illustrating the configuration of the filter frame to which the filter is assembled, and is a partial sectional view for illustrating peripheries of an engagement projection and an engaging hole.

FIG. 4A and FIG. 4B are illustrations of a state in which the filter 71 is assembled to the filter frame 51. FIG. 4A is a front view as seen from the plus direction of the Y axis. The filter 71 having a rectangular plate-like shape is placed on the bases 52a, 52b, 52c, and 52d illustrated in FIG. 3A. After that, the extension portions 53a, 53b, 53c, and 53d are bent at substantially right angles in the minus direction of the Y axis indicated in FIG. 3A using a finger, a jig, or other tools.

That is, FIG. 4A is an illustration of a state after the extension portions 53a, 53b, 53c, and 53d are bent. At this time, the engagement projections 58a, 58b, 58c, and 58d penetrate the filter 71, and are engaged with the engaging holes 56a, 56b, 56c, and 56d, respectively. In this manner, the filter 71 is assembled to the filter frame 51. The eight engagement projections 58a, 58b, 58c, and 58d illustrated in FIG. 4A have the same peripheral configuration. Accordingly, the peripheral configuration of one engagement projection 58a among the eight engagement projections is described with reference to FIG. 4B.

FIG. 4B is an illustration of a state after the extension portion 53a is bent, and is a partial sectional view taken along the line B-B of FIG. 4A. The extension portion 53a is coupled to the base 52a by the hinge 60a. The hinge 60a is formed to have a thickness smaller than thicknesses of peripheral portions, and thus has elasticity. Therefore, the extension portion 53a can be turned about the hinge 60a against an elastic force of the hinge 60a to be bent and deformed with respect to the base 52a.

Thus, when the extension portion 53a is turned about the hinge 60a in a counterclockwise direction, the engagement projection 58a on the filter clamping rib 57a formed at a right angle to the extension portion 53a is first brought into abutment against a surface of the filter 71 in an uncompressed state.

After that, a distal end of the engagement projection 58a penetrates the filter 71, and the filter clamping rib 57a compresses the filter 71. After the distal end of the engagement projection 58a passes through the engaging hole 56a, a catching portion of the engagement projection 58a passes beyond the base 52a so that the engagement projection 58a is brought into abutment against the base. Owing to the elastic force of the hinge 60a, the engagement projection 58a is engaged with the base 52a while keeping abutment against the base 52a. In this manner, the extension portion 53a is bent at a substantially right angle to the base 52a, and clamps the filter 71.

As described above, the eight engagement projections 58a, 58b, 58c, and 58d illustrated in FIG. 4A are engaged with the bases 52a, 52b, 52c, and 52d. In this manner, the extension portions 53a, 53b, 53c, and 53d are bent at substantially right angles to the bases 52a, 52b, 52c, and 52d, respectively, and clamp the filter 71.

Next, configurations of corner portions of the filter frame 51 after the filter 71 is mounted to the filter frame 51 are described with reference to FIG. 5A to FIG. 5C. The four corner portions of the filter frame 51 have the same configuration, and hence the configuration of one of the corner portions is described below.

Figure 5A:
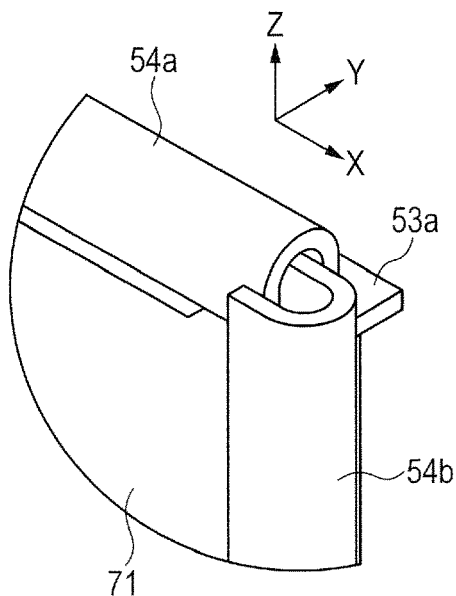
FIG. 5A is an explanatory view for illustrating a detailed configuration of the filter frame to which the filter is assembled, and is a perspective view for illustrating a front surface, a right side surface, and an upper surface of a right upper corner portion.
Figure 5B:
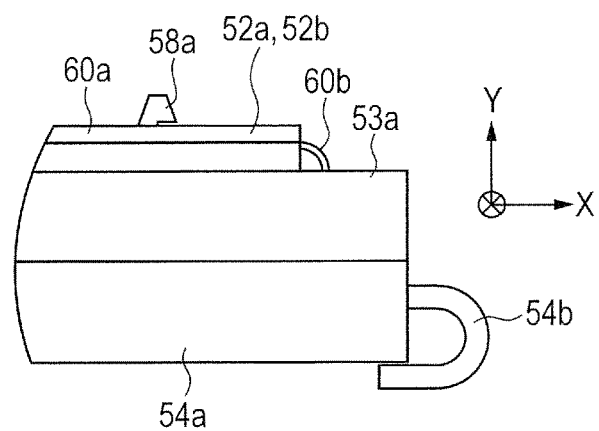
FIG. 5B is an explanatory view for illustrating the detailed configuration of the filter frame to which the filter is assembled, and is a top view for illustrating the right upper corner portion.
Figure 5C:
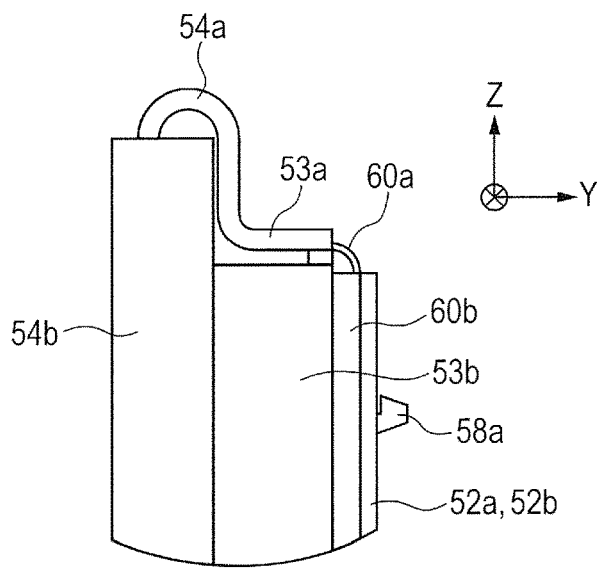
FIG. 5C is an explanatory view for illustrating the detailed configuration of the filter frame to which the filter is assembled, and is a right side view for illustrating the right upper corner portion.

FIG. 5A is an enlarged view for illustrating the portion A of FIG. 2. FIG. 5B is a top view of FIG. 5A. FIG. 5C is a front view of FIG. 5A. The extension portions 53a and 53b are bent at substantially right angles to the bases 52a and 52b, respectively, to thereby clamp the filter 71. In a bending step, first, the extension portion 53a is turned about the hinge 60a to be bent at substantially a right angle to the base 52a. Then, the extension portion 53b is turned about the hinge 60b to be bent with respect to the base 52b. However, a turning track of the termination portion 54b causes the termination portion 54b to interfere with the termination portion 54a.

However, the filter frame 51 is formed of an elastic material with low rigidity, such as polypropylene or nylon. Accordingly, although a bent portion of the termination portion 54b enters and interferes with a bent portion of the termination portion 54a, the termination portion 54b can forcibly be assembled into the termination portion 54a.

In the above-mentioned manner, at the four corner portions of the filter frame 51, the bent portion of the termination portion 54b is assembled into the bent portion of the termination portion 54a and a bent portion of the termination portion 54c, and a bent portion of the termination portion 54d is assembled into the bent portion of the termination portion 54a and the bent portion of the termination portion 54c. That is, at the four corner portions of the filter frame 51, each of the termination portion 54b and the termination portion 54d is assembled to the termination portion 54a and the termination portion 54c so as to overlap the termination portion 54a and the termination portion 54c. In this manner, the extension portions 53a, 53b, 53c, and 53d are bent at substantially right angles to the bases 52a, 52b, 52c, and 52d, respectively, to thereby clamp the filter 71.

Figure 6:
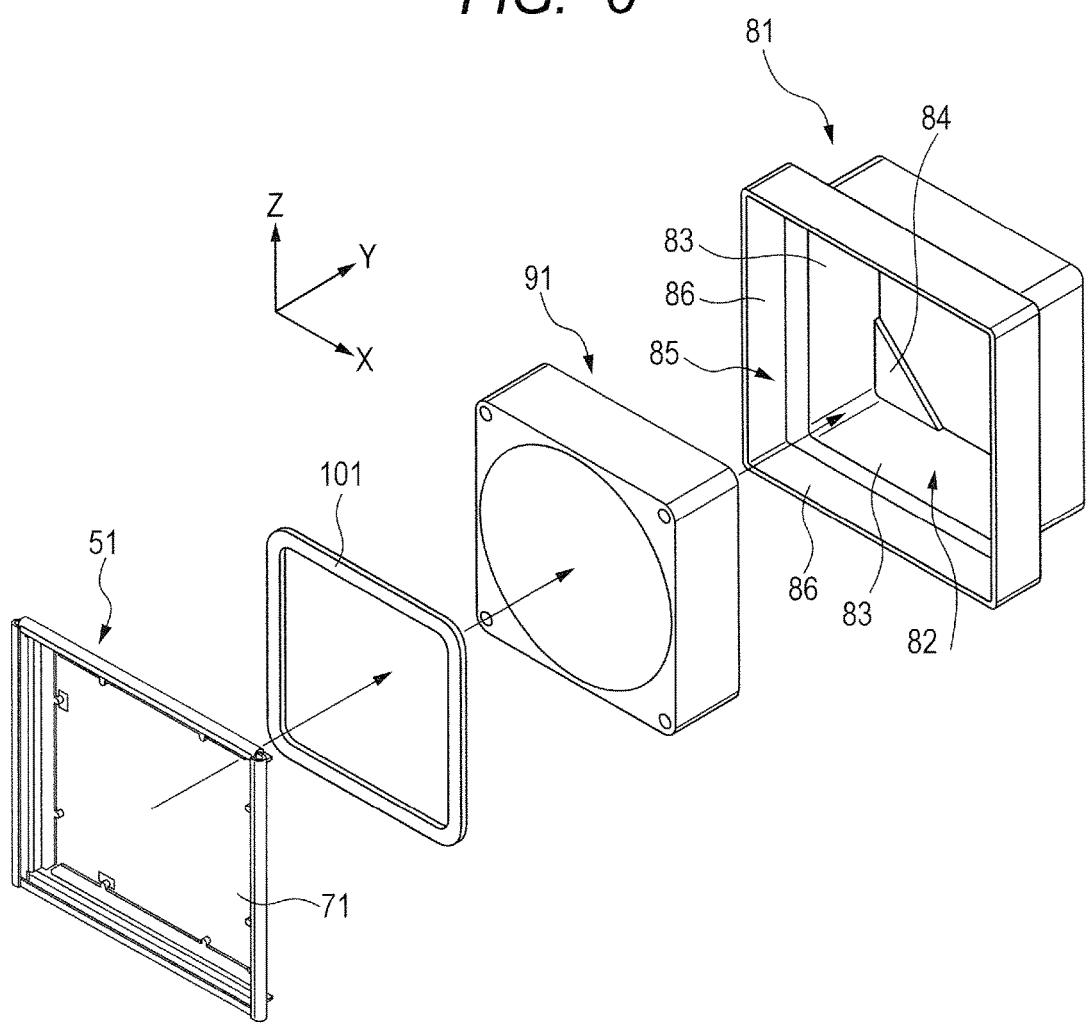
FIG. 6 is an exploded perspective view for illustrating components arranged on a periphery of the filter frame.

Next, a procedure of installing the filter frame 51 in the main body 30 of the image forming apparatus of the first embodiment and a procedure of replacing the filter frame 51 are described with reference to FIG. 6 to FIG. 8. FIG. 6 is an exploded perspective view for illustrating components arranged on a periphery of the filter frame 51. A duct 81, an axial fan 91, and a sealing member 101 are arranged in the main body 30 of the image forming apparatus. A fan storage portion 82 is formed in the duct 81, and the axial fan 91 is stored in the fan storage portion 82. The sealing member 101 formed of rubber or sponge is fixed to a front surface of the axial fan 91 with a double-sided adhesive tape. The filter frame in which the filter 71 is incorporated is fixed to a filter frame storage portion 85 of the duct 81.

Figure 7A:
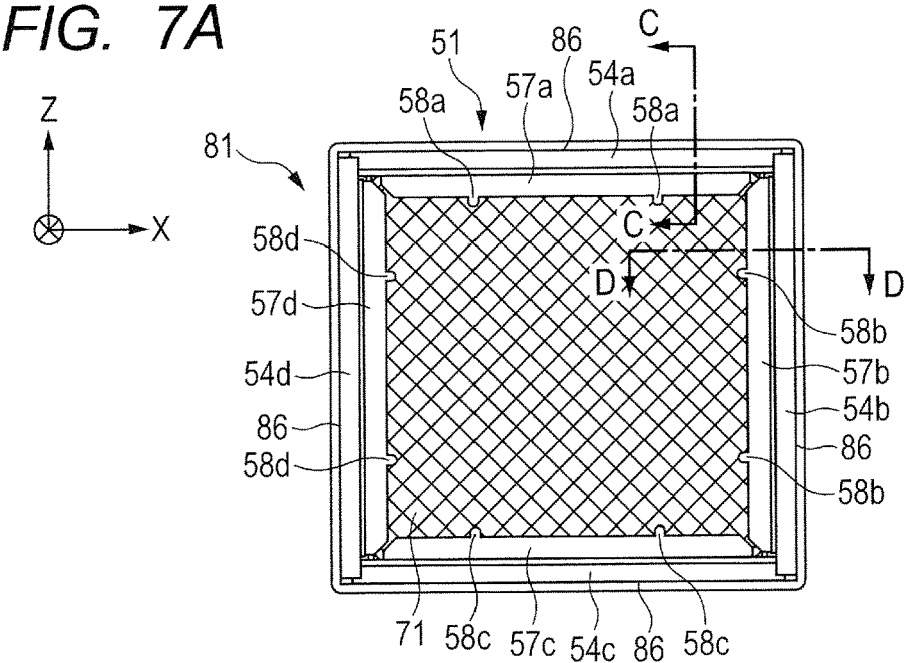
FIG. 7A is an explanatory view for illustrating a configuration in a state in which the filter frame is installed in a duct, and is a front view as seen from the direction of mounting the filter frame.
Figure 7B:
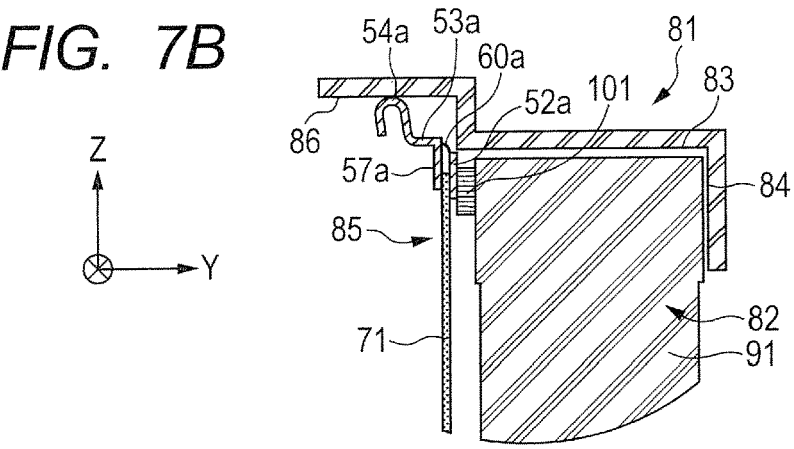
FIG. 7B is an explanatory view for illustrating the configuration in the state in which the filter frame is installed in the duct, and is a partial vertical sectional view for illustrating the right upper corner portion.
Figure 7C:
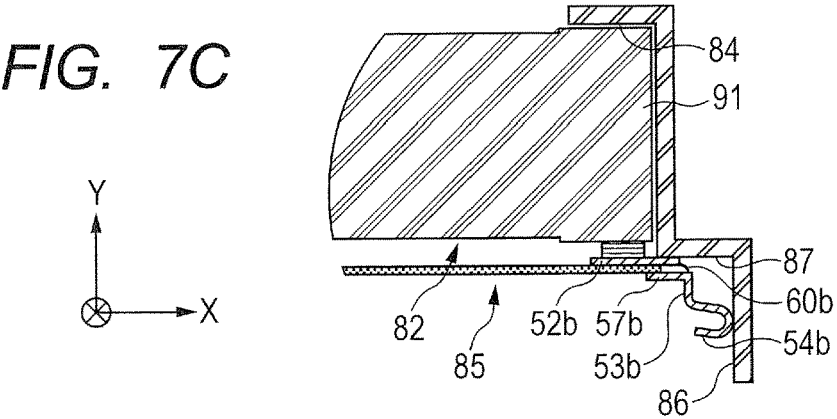
FIG. 7C is an explanatory view for illustrating the configuration in the state in which the filter frame is installed in the duct, and is a partial sectional view for illustrating the right upper corner portion.

FIG. 7A to FIG. 7C are illustrations of a state in which the filter frame 51 is installed in the duct 81. FIG. 7A is a front view for illustrating the filter frame 51 and the duct 81 as seen from a direction of mounting the filter frame 51 to the duct 81. Sides of the filter frame when being installed in the duct 81 have the same configuration. Accordingly, a configuration of a right upper portion of the filter frame 51 illustrated in FIG. 7A is described with reference to FIG. 7B and FIG. 7C. Further, a configuration of the duct 81 is described with reference to FIG. 8.

FIG. 7B is a partial sectional view taken along the line C-C of FIG. 7A. FIG. 7C is a partial sectional view taken along the line D-D of FIG. 7A. FIG. 8 is a front view for illustrating the duct 81 as seen from the direction of mounting the filter frame 51 to the duct 81. The axial fan 91 has an outer shape smaller than a shape formed by four inner walls 83 defining the fan storage portion 82 of the duct 81. Thus, the axial fan 91 is reliably stored in the fan storage portion 82. As illustrated in FIG. 8, fan regulation portions 84 configured to regulate a position of the axial fan 91 in a direction of mounting the axial fan 91 are formed at corner portions of the fan storage portion 82.

In a process of incorporating the filter frame 51 into the filter frame storage portion 85 of the duct 81, as illustrated in FIG. 7B and FIG. 7C, the bent portion of the termination portion 54a and the bent portion of the termination portion 54b are incorporated into the filter frame storage portion 85 of the duct 81 while being slid on the inner walls 86 of the filter frame storage portion 85. As illustrated in FIG. 7B, until the base 52b is brought into abutment against a filter regulation portion 87 of the filter frame storage portion 85 while compressing the sealing member 101, the filter frame 51 is pushed into the duct. As a result, the filter frame 51 is fixed in the duct 81 with frictional resistance between the bent portion of the termination portion 54a and the inner wall 86 of the duct 81 and between the bent portion of the termination portion 54b and the inner wall 86 of the duct 81.

In the above-mentioned manner, while the termination portions 54a, 54b, 54c, and 54d are elastically deformed within the inner walls 86 of the duct 81, the filter frame 51 is installed in the duct 81 with frictional resistance between the bent portions of the termination portions 54a, 54b, 54c, and 54d and the inner walls 86 of the duct 81. In this manner, the filter frame 51 is reliably positioned and held in the duct 81, and tightness between the filter frame 51 and the duct 81 is increased. Accordingly, it is not necessary to provide the sealing member in the filter case itself unlike the related art, and a dust collecting function of the filter 71 can be ensured.

When the filter 71 is removed from the filter frame 51 installed in the duct 81 in order to replace the filter 71, first, the filter frame 51 is removed from the duct 81 in such a manner that fingers or tools are hooked on insides of the bent portions of the termination portions 54a, 54b, 54c, and 54d of the filter frame 51. After that, the engagement projections 58a, 58b, 58c, and 58d of the filter frame 51 are elastically deformed and disengaged from the engaging holes 56a, 56b, 56c, and 56d in such a manner that the engagement projections 58a, 58b, 58c, and 58d are caught by fingers or tools from a side of the engagement projections 58a, 58b, 58c, and 58d.

In this manner, the filter frame 51 is unfolded as illustrated in FIG. 3A. Thus, the filter 71 to be replaced can easily be removed. Then, the new filter 71 to be installed is placed on the bases 52a, 52b, 52c, and 52d of the filter frame 51. After that, the extension portions 53a, 53b, 53c, and 53d of the filter frame 51 are bent at substantially right angles to the bases 52a, 52b, 52c, and 52d, respectively. In this manner, there is formed the filter frame 51 for replacement, on which the filter 71 is clamped.

When projections (not shown) are formed on the inner walls 86 in the filter frame storage portion 85, the filter frame 51 may be installed in the duct 81 in such a manner that the termination portions 54a, 54b, 54c, and 54d of the filter frame 51 climb over the projections. With this configuration, the filter frame 51 can be prevented from slipping out of the duct 81 due to vibration of the fan 91.

According to the embodiment of the present invention, the bent portions are formed on four peripheral sides of the filter frame having a rectangular outer shape and including the dust proof filter mounted thereto. Accordingly, the bent portions are elastically deformed by being brought into abutment against the inner walls of the duct, and the filter frame is installed in the duct. In this manner, the filter frame is fixed in the duct with frictional resistance between the bent portions and the inner walls of the duct. Therefore, airtightness in the duct is ensured, and a dust collecting function of the dust proof filter is reliably ensured.

The filter frame is integrally formed of a resin material, and a stationary-side region on which the dust proof filter is placed, and a movable-side region to be bent at a substantially right angle to the stationary-side region are coupled to each other by a hinge having a thickness smaller than thicknesses of peripheral portions. With this simple configuration, the filter can reliably be replaced and assembled to the filter frame.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228435, filed Nov. 25, 2016, which is hereby incorporated by reference herein in its entirety.

What is claimed is:

1. A filter frame for an image forming apparatus, comprising:
  a rectangular base part including a rectangular opening, defining a rectangular outer shape, and including a plurality of engaging holes formed each side thereof;
  an extension portion extending outward from each of the sides of the rectangular base part, and including a plurality of engagement projections corresponding to the plurality of engaging holes;
  a termination portion formed at an end of the extension portion and including a bent portion; and
  a hinge configured to couple each of the extension portions with the rectangular base part,
  wherein the rectangular base part, each of the extension portions, each of the termination portions, and each of the hinges are formed integrally,
  wherein the rectangular base part allow a dust proof filter having a rectangular plate-like shape to be placed thereon,
  wherein each of the extension portions is turned about each of the hinges and bent at right angle to the rectangular base part, and then each of the extension portions is engaged with each of the sides of the rectangular base part so as to clamp the dust proof filter, and
  wherein each of the termination portions is elastically deformed and fixed to an inner wall of each side of a duct.

2. A filter frame according to claim 1, wherein, at a corner portion of the filter frame, termination portions adjacent to each other of the termination portions are assembled so as to overlap each other.

* * * * *